United States Patent [19]

Hess

[11] Patent Number: 5,644,599

[45] Date of Patent: Jul. 1, 1997

[54] MULTISITE DIGITAL RADIO COMMUNICATION SYSTEM WITH SIGNAL DIVERSITY

[75] Inventor: Garry Carson Hess, Elgin, Ill.

[73] Assignee: Motorola, Inc., Schaumburg, Ill.

[21] Appl. No.: 345,059

[22] Filed: Nov. 25, 1994

[51] Int. Cl.$^6$ .................................................. H04B 7/02
[52] U.S. Cl. .................. 375/267; 375/224; 375/227; 375/347; 375/349; 455/67.3; 455/135; 455/226.3
[58] Field of Search ........................................ 375/211, 213, 375/219, 224, 226–228, 260, 267, 285, 299, 346, 347, 349; 455/33.1, 49.1, 52.1, 52.3, 53.1, 54.1, 54.2, 56.1, 67.1, 67.3, 101, 133–135, 137, 226.1–226.4

[56] References Cited

U.S. PATENT DOCUMENTS 4,868,885  9/1989  Perry ................................... 455/226.2
4,891,812  1/1990  Bocci et al. ............................. 371/5.5
5,113,413  5/1992  Brown et al. ............................. 375/40
5,402,451  3/1995  Kaewell, Jr. et al. ................... 375/347
5,440,590  8/1995  Birchler et al. ......................... 375/347

*Primary Examiner*—Stephen Chin
*Assistant Examiner*—Amanda T. Le
*Attorney, Agent, or Firm*—Andrew S. Fuller

[57] ABSTRACT

A radio communications system (100) has multiple receive sites (210, 250) for providing signal diversity for a common source signal. At a receive site (210), data is received on a wireless communication channel (208), and associated signal quality determined for the data received. Coefficients of a time domain function defining the signal quality are determined and transferred, along with the data, to a central site (110). At the central site (110), the data transferred from multiple receive sites (210, 250) is weighted according to the corresponding time domain functions to recover the source signal.

22 Claims, 4 Drawing Sheets

MULTISITE DIGITAL RADIO COMMUNICATION SYSTEM WITH SIGNAL DIVERSITY

TECHNICAL FIELD

This invention relates in general to radio communication systems, and more particularly, to a multisite communication system employing signal diversity reception.

BACKGROUND OF THE INVENTION

Communication systems employing signal diversity reception are known. In one example, remote receive sites are located throughout the coverage area of a communication system in order to improve signal reception from low powered communication devices. Each remote site that contemporaneously receives a version of a common source signal transmitted from a communication device, transfers the received signals to a common location, or central site, where these signals are used to derive an output signal representing the originally transmitted source signal. Generally, in an analog communication system, a voter compares the signal quality for the signals received from the various remote receive sites and selects the site which has the best signal quality as the preferred source for the originally transmitted signal.

The use of digital transmissions presents additional opportunities over that of analog transmissions for providing an enhanced signal reception system. The original digital message can be derived from more sophisticated analysis of the various messages available at the remote receive sites. For example, error detection coding may be included in each message received at a remote receive site. The central site then chooses from among the messages received at the various remote sites to minimize the potential of error. In another example, remote receive sites, which receive signals with a signal quality above some predetermined threshold, transfer the signal, in the form of a data symbol stream, back to a common location. The data symbols are then time aligned, if necessary, and voted on symbol by symbol. Generally, the output data symbol stream contains the most frequently occurring symbols from all the receive sites. When the number of receive sites is even, other approaches are needed to choose the proper data symbols within the received data symbol stream.

It is desirable to improve the likelihood of recovering an original transmitted source signal by employing geographically separated remote receive sites. The signal quality of each version of a signal received at each remote receive site may be affected by a variety of factors. Preferably, a substantial portion of the available signal quality information is used to recover the transmitted signal. A method in which the original source signal is determined based on a simple numerical preponderance of particular data symbols from the various remote sites is not sufficient. Therefore, a new signal diversity reception scheme is needed that better utilizes available information to recover an original source signal.

DETAILED DESCRIPTION OF THE PREFERRED EMBODIMENT

Figure 1:
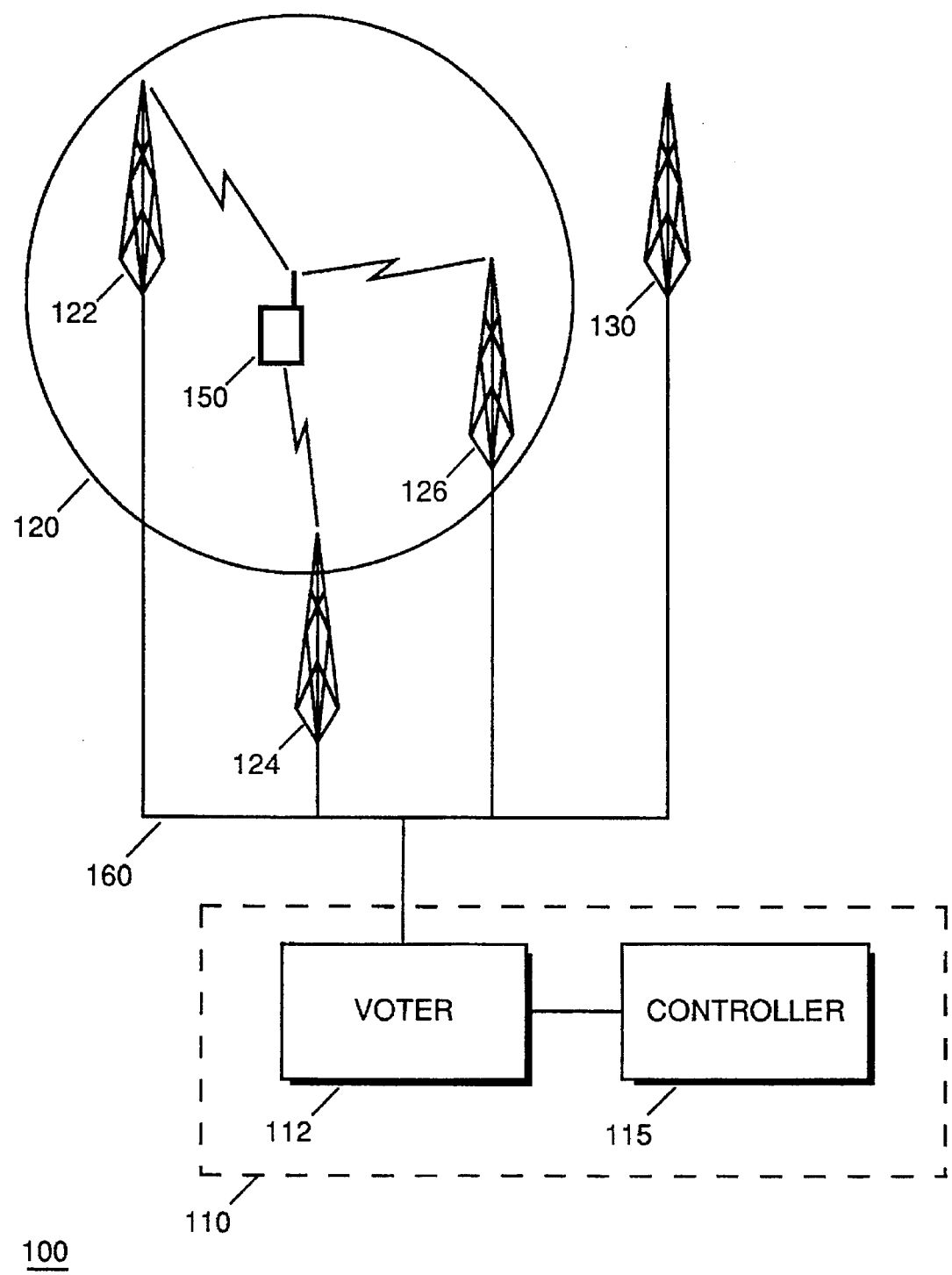
FIG. 1 is a block diagram of a multi-site digital radio communication system which incorporates remote sites, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides for signal diversity in a digital radio communication system having multiple remote sites which serve to receive signals from a common source, such as a radio transceiver. Recognizing that the task of recovering a common source signal received at multiple remote receive sites is best accomplished by using all available information, the present invention provides for the transmission and use of signal quality information from each remote receive site. When a version of a transmitted source signal is received at a remote receive site, the quality of source signal is obtained, and coefficients determined for a time domain function defining this signal quality. The contents of the receive source signal, and the coefficients for the time domain function, are transmitted to a central site, which uses such information, along with similar information received from various remote receive sites, to help determine the content of the transmitted source signal. The central site assigns a weight to the components of each version of the source signal received from a remote site, and combines these components, adjusted by weight, to help in determining the contents of the original source.

FIG. 1 is a block diagram of a multisite digital radio communication system 100, which incorporates remote sites for signal diversity purposes, in accordance with the present invention. The communication system 100 includes remote sites 122, 124, 126, 130 which are used to receive signals sourced by a radio transceiver 150. The sites 122, 124, 126, 130 may be configured to be used primarily as receive sites in order to support radio transceivers having a limited coverage area. In the preferred embodiment, a radio transceiver 150 is situated to have a coverage area 120. Consequently, signals transmitted by the radio transceiver 150 are capable of being received at sites 122, 124, and 126. However, these signals cannot be received by site 130. The remote sites 122, 124, 126, 130 are coupled to a central site 110 via wire or wired transmission links 160. The central controller site 110 incorporates a voter 112 and a controller 115. The voter accepts signals received at the various sites and makes a determination as to the contents of the original source signal transmitted by a transceiver. The organization shown in the preferred embodiment is typical with respect to trunked communication systems incorporating remote receive sites.

Figure 2:
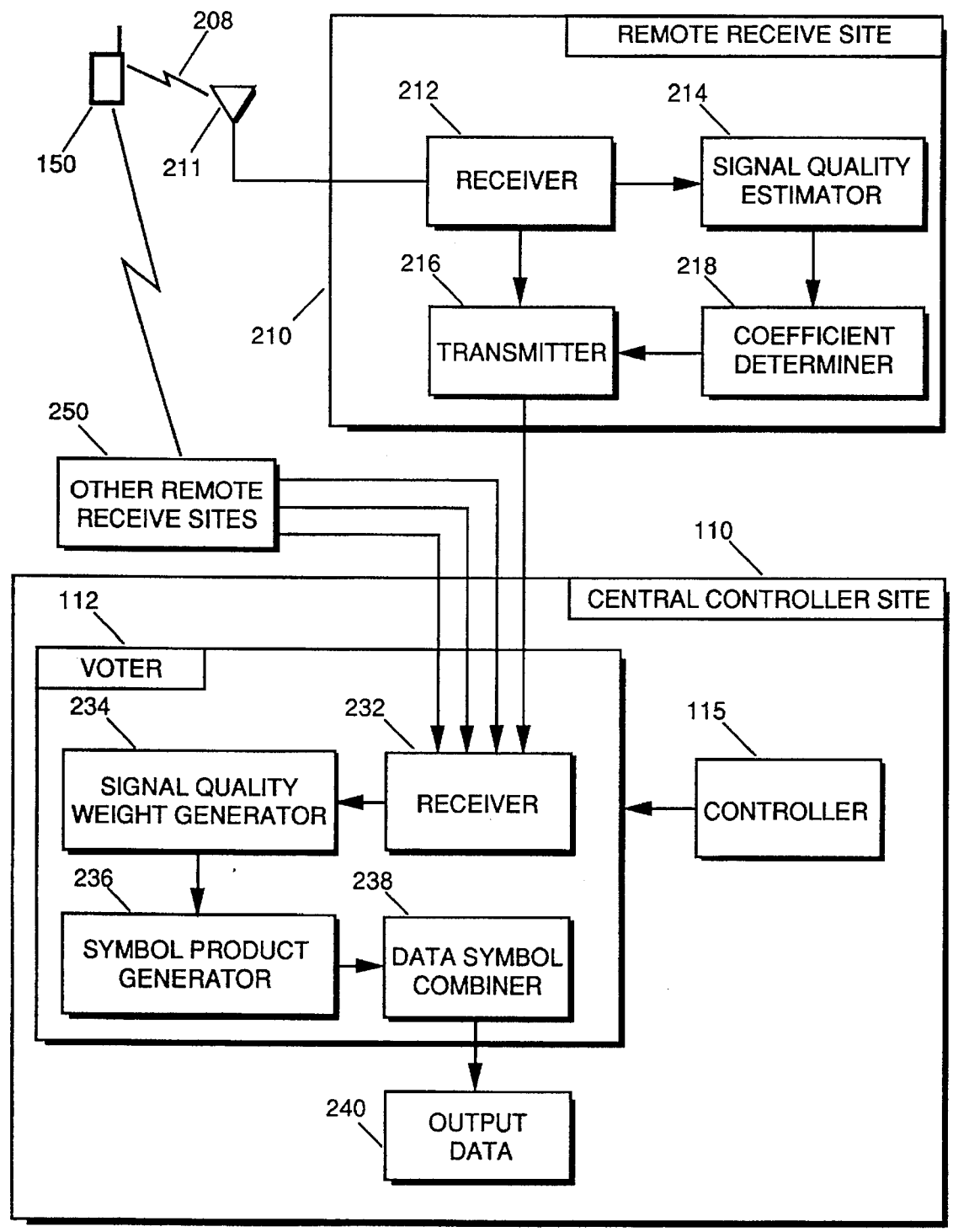
FIG. 2 is a block diagram of the communication system of FIG. 1 highlighting structural components of a remote site, and a central controller site, in accordance with the present invention.

FIG. 2 is a block diagram showing functional components of the remote receive site 210, and of the central controller site 110. The remote receive site 210 includes a receiver 212, a signal quality estimator 214, a coefficient determiner 218, a transmitter 216, and an antenna 211. At the central controller site 110, the voter 112 includes a receiver 232, a signal quality weight generator 234, a symbol product generator 236. The voter 112 operates under the control of the controller 115 to produce output data 240 representing the contents of a transmitted source signal. The output data 240 can be further processed through error correction hardware and software (not shown) to produce a better representation of the transmitted source signal.

Figure 3:
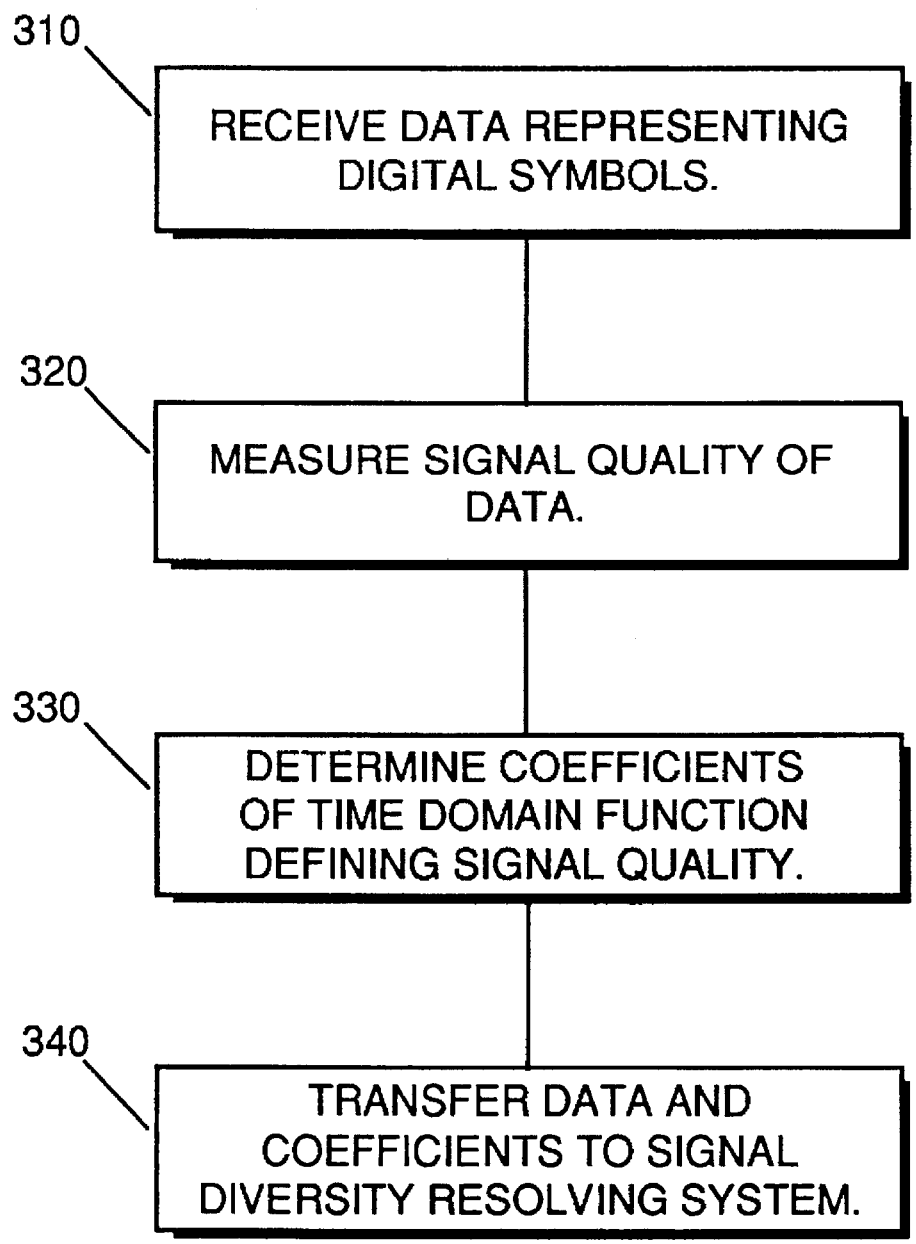
FIG. 3 is a flowchart of procedures used by a remote receive site in accordance with the present invention.

FIG. 3 is a summary of procedures depicting the operational aspects of a remote receive site 210, in accordance with the present invention. Referring to FIG. 2 and FIG. 3, the remote receive site 210 operates on a source signal transmitted by the radio transceiver 150 on a wireless communication link or channel 208, which source signal is received at the antenna 211. Generally, the remote receive site 210 receives a transmission representing data comprising digital data symbols on the wireless communication channel, step 310. The receiver 212 demodulates and decodes the transmission to extract its contents, which typically represent a digital data packet. The signal quality of the data received is measured using the signal quality estimator 214, which characterizes signal quality over the duration of a transmission, step 320. Preferably, the signal quality estimator 214 bases its determination on the ratio of a desired signal power to a sum of interference power and noise power. Alternatively, the signal quality estimator 214 may generate a signal quality indicator based on the total power of the receive signal. The remote receive site 210 then uses the coefficient determiner 218 to determine the coefficients of a time domain function, which defines the signal quality of the data received over the duration of the transmission, step 330. When the expected rate of change of signal quality during transmission is slow, a linear function is used. A more rapid and complex rate of change may require a fast Fourier transform model time domain function, which in some cases may be approximated by a linear regression curve fit. Thus, the coefficients depend on the time domain function chosen to describe the change in signal quality, i.e., a linear function, a linear regression curve fit, or other fast Fourier transformations.

The coefficients are determined for a packet of data that comprise data symbols, which are typically bits of information. The time domain function and associated coefficients represent a historical assessment of the signal quality of the data being received. Thus, if the signal quality varies during receipt of the packet of information, the time domain function and associated coefficients properly characterize the signal quality of the data. Preferably, the signal quality is expressed in decibel values for each digital symbol of the data received, and the time domain function is generated based on these decibel values. Particular decibel values may be assigned when the measured signal quality for a particular digital signal is within a predetermined range. Historical signal quality information allows for the accommodation of Rayleigh fading in signal reception. When Rayleigh fading is slow relative to the duration of a packet, it is possible to achieve good signal quality estimates for each component of a data packet using a simple linear regression curve fit to signal/noise variation in time. Accordingly, only two coefficients would be needed to be relayed with each packet. Once determined, the coefficients for the time domain function are transferred along with the data packet to the central site, which performs signal diversity resolution on similar signals received from other sites, step 340.

Figure 4:
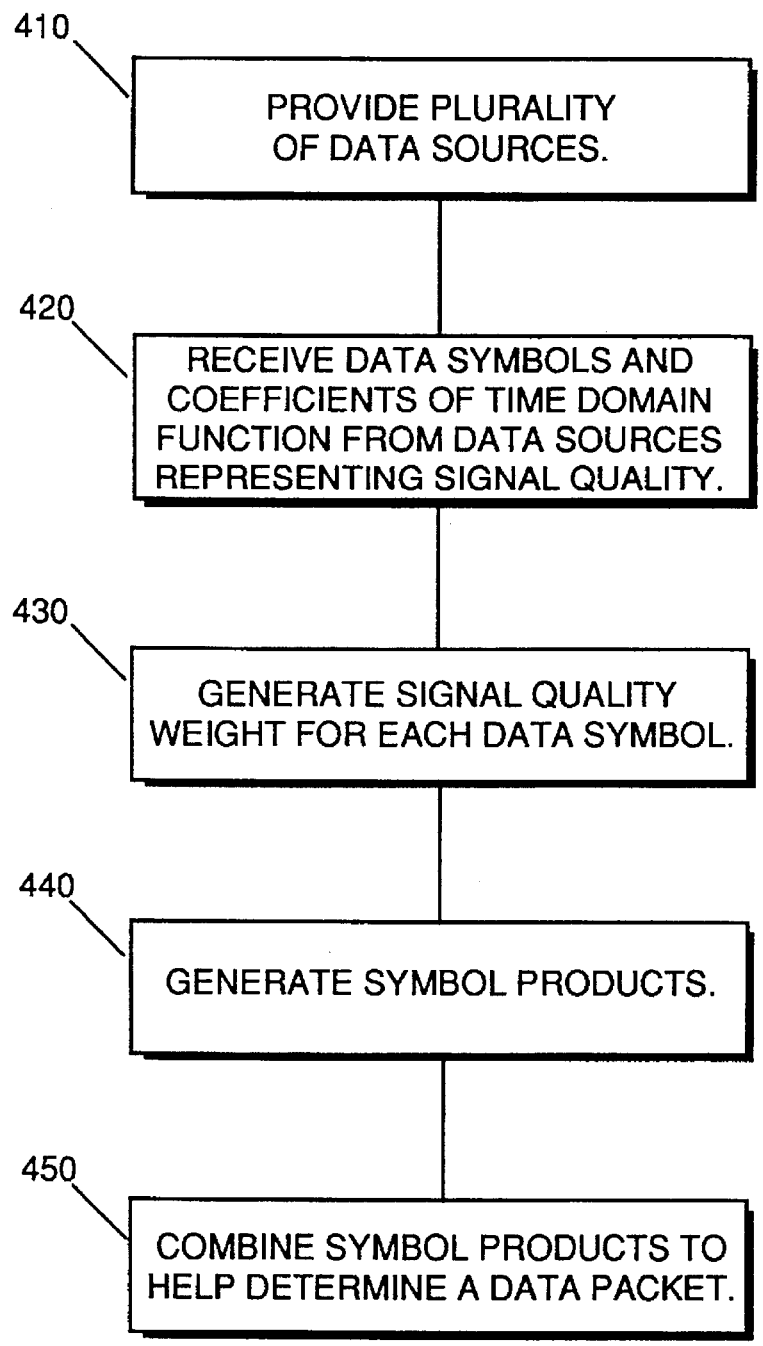
FIG. 4 is a flowchart of procedures for the operation of the central controller site in accordance with the present invention.

FIG. 4 is a summary of procedures describing the operational aspects of the central controller site, in accordance with the present invention. Referring to FIG. 2 and FIG. 4, the central controller site 110 uses as data sources, the remote receive site 210, as well as other remote sites 250 that are within communication range of the radio transceiver 150. The voter 112, through the receiver 232, receives data packet symbols, and coefficients of a time domain function representing the signal quality of the data symbols from each data source, step 420. For each data symbol, a corresponding signal quality weight is generated using the time domain function, and the received coefficients pertaining to that particular data symbol, step 430, using the signal quality weight generator 234. Symbol products are generated by multiplying each data symbol by a corresponding signal quality weight, step 440, using the symbol product generator 236. In a binary symbol example, if the data symbol represents a logical one, a value of 1 is assigned to the data symbol. For a logical zero, a value of −1 is assigned to the data symbol. The symbol products are each adjusted by a corresponding signal quality weight, and combined for a particular position in the data stream, to determine a preferred data symbol. The preferred data symbols are combined by the data symbol combiner 238 to determine the original transmitted data packet, step 450.

In the preferred embodiment, a sum of the symbol products is determined. When binary data symbols are to be recovered, the sum is then compared to a threshold value to determine the data symbol. A symbol representing a logical one is assigned as the transmitted data symbol when the sum of the symbol is greater or equal to the threshold value. A symbol representing a logic zero is assigned as the transmitted data symbol when the sum is less than the threshold value. In general, estimators for the transmitted symbols are determined and a range of signal products mapped to a particular estimator. Correspondingly, a particular estimator is assigned when a transmitted symbol is within a particular range of symbol products and when not within the range a different estimator is assigned. Thus, the entire data packet can be recovered with appropriate signal quality weight being assigned to corresponding data symbols from each remote receive site.

The present invention offers significant advantages over the prior art. A source signal containing digital information received at geographically separated receiver sites can be combined based on the signal quality of each digital signal which is received at that site. Overhead is controlled by reducing the quantity of information which must be transferred from each remote receive site regarding the signal quality of the data stream received. This is achieved by providing coefficients of a time domain function selected to represent the signal quality characteristics of a received transmission. For example, in an application where the signal quality of a data packet does not change dramatically while the data packet is being received, the signal quality can be estimated based on a linear regression curve fit, and corresponding coefficients provided which describes this curve. Thus, substantial information concerning signal quality may be transmitted along with the data without a significant overhead. Rather than choosing data symbols by a simple numerical preponderance of available versions of the data symbols, the present invention incorporates historically based signal quality information to appropriately weight each version of a received signal and portions thereof. This approach mitigates voting decision problems present in prior art voting schemes when an even number of versions of a signal is available from corresponding receive sites. The result is a more accurate determination of the data stream which was originally transmitted, while incorporating significant efficiencies.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a digital radio communications system having a receive site for providing signal diversity, a method comprising the steps of:

receiving data representing data symbols on a wireless communication channel;

determining a signal quality for the data received;

determining coefficients of a time domain function defining the signal quality of the data received, the time domain function and corresponding coefficients describing variations in the signal quality over time; and transferring, to a central site, the data and coefficients of the time domain function.

2. The method of claim 1, wherein the step of determining a signal quality comprises the step of using a signal quality estimator based on a ratio of desired signal power to a sum of interference power and noise power.

3. The method of claim 1, wherein the step of determining a signal quality of the data received comprises the step of determining signal quality using a receive signal strength indicator based on a total received signal power for the data.

4. The method of claim 1, wherein the step of determining coefficients of a time domain function comprises the step of determining the coefficients of a linear function.

5. The method of claim 1, wherein the step of determining coefficients of a time domain function comprises the step of generating a linear regression curve fit.

6. The method of claim 1, wherein the step of determining coefficients of a time domain function comprises the step of generating a fast Fourier transform model.

7. The method of claim 1, further comprising the step of generating a decibel value for signal quality of each data symbol of the data received.

8. The method of claim 7, wherein the step of determining coefficients of a time domain function comprises the step of generating a fast Fourier transform model for decibel values representing the signal quality of the data symbols.

9. The method of claim 7, wherein the step of determining coefficients of a time domain function comprises the step of generating a linear regression model for decibel values representing the signal quality of the data symbols.

10. The method of claim 7, wherein the step of generating a decibel value for signal quality comprises the step of assigning a particular value for the decibel value of the signal quality for a particular data symbol when a measured signal quality for the particular data symbol is within a predetermined range.

11. A method of using signal diversity in a digital radio communications system to recover data packet symbols, comprising the steps of:

providing a plurality of data sources;

receiving, from each data source, data symbols, and coefficients of a time domain function representing signal quality of the data symbols;

generating a corresponding signal quality weight for each data symbol received using the time domain function and the received coefficients;

generating symbol products by multiplying each data symbol by the corresponding signal quality weight; and combining the symbol products to recover the data packet symbols.

12. The method of claim 11, further comprising the steps of:

determining a sum of the symbol products;

comparing the sum with a threshold value;

assigning a first symbol to a data packet symbol when the sum is greater or equal to the threshold value; and assigning a second symbol to the data packet symbol when the sum is less than the threshold value.

13. The method of claim 11, further comprising the steps of:

providing a plurality of estimators for transmitted symbols;

mapping of a range of symbol products to each of the plurality of estimators; and assigning a corresponding estimator when a transmitted symbol is within a particular range of symbol products.

14. The method of claim 11, wherein the step of receiving, from each data source, comprises the step of receiving data symbols from a remote receive site.

15. A method of using signal diversity to recover a data packet in a digital radio communications system having a central voting site and at least one remote receive site, comprising the steps of:

at the at least one remote receive site:

receiving data representing data symbols on a wireless communication channel corresponding to the data packet;

measuring signal quality for the data symbols;

determining coefficients of a time domain function defining the signal quality of the data symbols; and transferring to the central voting site the data and coefficients of the time domain function;

at the central voting site:

receiving, from each of the at least one remote receive site, data symbols and coefficients of a time domain function representing the signal quality of the data symbols;

generating a corresponding signal quality weight for each data symbol received using the time domain function and the received coefficients;

generating symbol products by multiplying each data symbol by the corresponding signal quality weight; and combining the symbol products to recover the data packet.

16. The method of claim 15, wherein the step of determining coefficients of a time domain function comprises the step of determining the coefficients of a linear function.

17. The method of claim 15, wherein the step of determining coefficients of a time domain function comprises the step of generating a linear regression curve fit.

18. The method of claim 15, wherein the step of determining coefficients of a time domain function comprises the step of generating a fast Fourier transform model.

19. The method of claim 15, further comprising the step of generating a decibel value for signal quality of each data symbol of the data received.

20. The method of claim 19, wherein the step of determining coefficients of a time domain function comprises the step of generating a fast Fourier transform model for decibel values representing the signal quality of the data symbols.

21. The method of claim 19, wherein the step of determining coefficients of a time domain function comprises the step of generating a linear regression model for decibel values representing the signal quality of the data symbols.

22. The method of claim 19, wherein the step of generating a decibel value for signal quality comprises the step of assigning a particular value for the decibel value of the signal quality for a particular data symbol when a measured signal quality for the particular data symbol is within a predetermined range.

* * * * *